United States Patent [19]

Sverre et al.

[11] 4,422,933

[45] Dec. 27, 1983

[54] MAGNETIC WATER CONDITIONING DEVICE

[76] Inventor: Severin F. Sverre, 3187 Thompson Pl., West Vancouver, B.C., Canada, V7V 3E3, John O. Richmond, 4750 Narvaez, Dr., Vancouver, B.C., Canada, V6L2J2

[21] Appl. No.: 314,729

[22] Filed: Oct. 26, 1981

[30] Foreign Application Priority Data

Jun. 19, 1981 [CA] Canada .................................. 380251

[51] Int. Cl.³ ............................................ B01D 35/06
[52] U.S. Cl. .................................... 210/222; 210/223
[58] Field of Search ............... 210/222, 223, 431, 432, 210/390, 429

[56] References Cited

U.S. PATENT DOCUMENTS 1,934,314 11/1933 Lanler .................................. 210/431
2,797,704 7/1957 McDermott et al. ............... 210/431
4,265,754 5/1981 Menold .............................. 210/222

FOREIGN PATENT DOCUMENTS 143813 1/1962 U.S.S.R. .............................. 210/222

Primary Examiner—Charles N. Hart
Assistant Examiner—Sharon T. Cohen
Attorney, Agent, or Firm—Spensley, Horn, Jubas & Lubitz

[57] ABSTRACT

This invention is directed to an adjustable-flow water conditioning device. More particularly, this invention is directed to a magnetic water conditioning device which can be manually adjusted to coordinate the conditioning effects of the device with the rate of water flow through the device. The invention is directed to a magnetic water conditioner comprising externally mounted means for permitting the distance and intensity of the magnetic field created within the conditioner by permanent magnets to be adjusted, without any disassembly of the device.

10 Claims, 4 Drawing Figures

MAGNETIC WATER CONDITIONING DEVICE

FIELD OF THE INVENTION

This invention is directed to an adjustable-flow water conditioning device. More particularly, this invention is directed to a magnetic water conditioning device which can be manually adjusted to coordinate the conditioning effects of the device with the rate of water flow through the device, without disassembly of the device in any way.

BACKGROUND OF THE INVENTION

For a number of years, it has been known that fresh water containing various dissolved minerals such as calcium and magnesium (calcareous material) could be effectively treated to reduce mineral precipitation from the water, when it is heated, by passing the water through a strong magnetic field. It is believed that passing the fresh water containing mineral through the magnetic field beneficially affects the growth pattern or crystal structure of the mineral ions dissolved in the fresh water. Subsequently, when the water is heated (which reduces the solubility of the minerals in the water at certain pH levels), the ions precipitate into the body of the water as discrete suspended particles, rather than deposit scale on the surfaces contacting the water. The individually suspended particles tend not to plate or deposit as scale on the walls of the water conduit and hence pass through the conduit along with the water. The calcareous material, after water containing the calcareous material is treated with a magnetic conditioner, is soft in texture and does not adhere to heat exchange surfaces.

The magnetic water conditioning device has also been found useful for removing existing scale which has been previously deposited in the conduit prior to installation of the magnetic water conditioner.

Prior magnetic water treating devices known to the applicant are disclosed in the following patents:
U.S. Pat. No. 2,678,729—Spondig (May, 1954)
U.S. Pat. No. 2,652,925—Vermeiren (September, 1953)
U.S. Pat. No. 2,825,464—Mack (March, 1958)
U.S. Pat. No. 2,939,830—Green et al.
U.S. Pat. No. 2,951,581—Moriya (September, 1960)
U.S. Pat. No. 3,170,871—Moriya (February, 1963)
U.S. Pat. No. 3,345,594—Vermeiren
U.S. Pat. No. 3,669,274—Happ et al. (June, 1972)
U.S. Pat. No. 3,680,705—Happ et al. (August, 1972)
U.S. Pat. No. 3,923,660—Kottmeier (December, 1975)
U.S. Pat. No. 4,146,479—Brown (March, 1979)
British Pat. No. 1,423,927—Sundt (February, 1976)

The magnetic water conditioning devices disclosed in these various references have several serious shortcomings and two major shortcomings. First, the permanent magnets utilized in the devices are not effectively insulated from the water passing through the devices and consequently solid material tends to deposit on the magnets, and the magnets tend to corrode over a period of time, thereby reducing their effectiveness.

Secondly, none of the magnetic devices disclosed has any inherent capability to deal with changing water flow rates or water pressures, or to vary the force of the magnetic field in relation to the flow-rate of water through the device, without disassembling of the device and manual internal adjustment.

This latter deficiency is particularly troublesome in new installations where the quantity of water used per day by the user or the rate of water flow is not accurately known. Consequently the unit that is installed may be either oversize or undersize. In such a case, the only remedy is to replace the unit with a unit of a different size, at substantial expense.

An adjustable magnetic water conditioner sold under the trade mark AQUA-DIAL 15 is available from BSAL Kingston-upon-Thames, Surrey, England. However, the adjustability feature in that device is located internally within the device and hence the device must be disassembled in order to make any necessary adjustments. Additionally, the device does not provide a built-in Venturi effect.

SUMMARY OF THE INVENTION

We have invented a magnetic water-treating device which, firstly, insulates the permanent magnets housed in the unit from the water that passes through the device, thereby eliminating solid deposits and corrosion of the magnets, and, secondly, permits ready manual adjustment in order to accommodate different water flow rates, without having to disassemble the device in any way. Varying water flow rates can be encountered either in one application, or when the device is installed in various applications involving differing water pressures and water flow rates.

Moreover, in our device, the strength and length of the magnetic field can be adjusted to suit various applications. The magnetic field can be adjusted from about 6,000 Gauss when the device is in fully open position to 12,000 Gauss when the device is almost completely closed. This feature is advantageous because a higher intensity magnetic field is preferred for slow flow rates.

A further significant advantage of our invention is that manual adjustments can be made externally simply by turning an externally located handle according to calibrations on the dial mounted under the handle. This eliminates the necessity of disassembling the device in order to make flow-rate adjustments. It also permits adjustments to be made quickly and frequently.

The invention is directed to a magnetic water conditioner comprising externally mounted means for permitting the distance and intensity of the magnetic field created within the conditioner by permanent magnets to be adjusted without disassembly of the conditioner.

A magnetic water conditioner containing one or more permanent magnets comprising means whereby the rate of water flow through the water conditioner can be adjusted externally.

In the magnetic water conditioner the permanent magnet positioned within the water conditioner is completely sealed against contact with water passing through the conditioner.

A magnetic water conditioner comprising a housing through which may pass, a waterproof permanent magnet containing body affixed to the water housing, separating the magnet from any water passing through the housing, the body containing therein adjustable distance cooperating interfaces for regulating the flow-rate of water through the water housing.

A magnetic water conditioning device comprising: (a) a hollow housing suitable for the passage therethrough of water; (b) a hollow cup affixed to housing (a); (c) a permanent magnet enclosed around its circumference within a water-protective sleeve, and at its ends respectively by an adjusting cap and a magnet extension, said components fitting as an assembled group within the interior of internal cup (b); and (d) internal cup (b) having therein one or more ports through which water may pass, and embodying therein externally adjustable interface surfaces which can be adjusted in distance from one another to thereby regulate the rate of flow of water through the interface area.

The conditioning device optionally can be equipped internally or externally with a water filtering device.

The device is also designed to provide a Venturi-type gap in the area where the magnetic field is concentrated thereby tending to keep the gap free of foreign particles.

DRAWINGS

DETAILED DESCRIPTION OF THE INVENTION

Figure 1:
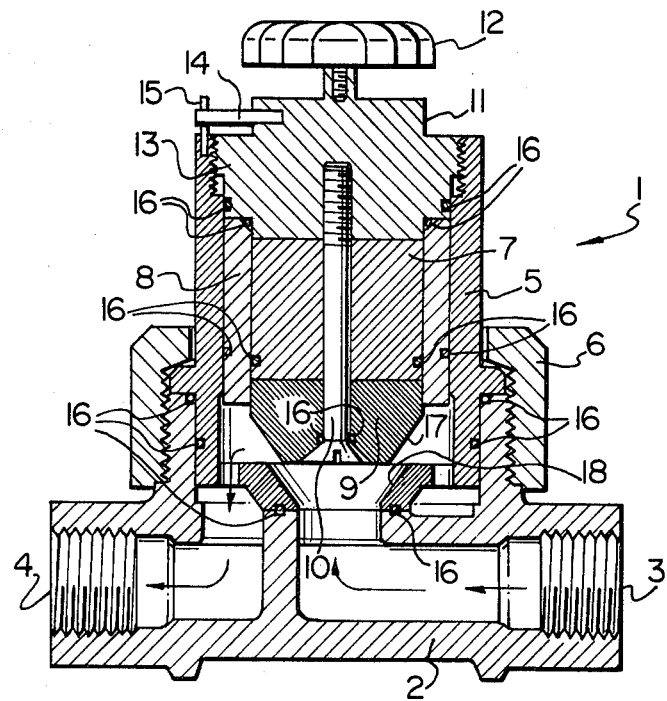
FIG. 1 represents a side elevation partly-sectioned view of the adjustable magnetic water conditioner.

Referring to FIG. 1, the magnetic water conditioner 1 is constructed of a hollow housing 2 having a water inlet 3 and a water outlet 4. Inlet 3 and outlet 4 are female threaded to accommodate standard size water piping. The direction of water flow through the housing 2 is indicated by the directional arrows.

Affixed to the housing 2 is a hollow cylindrical-like internal cup 5, which is held in place against the housing 2 by a circumferential collar 6. The internal cup 5 houses a permanent magnet 7, which preferably should be the strongest permanent magnet available, for example, the type of magnets described as "supermagnets" and sold under the names or trade marks Alcomax or Alnico.

Magnet 7 is enclosed by means of a hollow cylindrical magnet housing 8 which at its bottom region contacts magnet extension 9, and at its top region contacts adjusting cap 11. The magnet 7, magnet housing 8, and magnet extension 9 are held rigidly in place against adjusting cap 11 by means of screw 10.

Mounted above adjusting cap 11 and connected to it is an adjusting handle 12. Adjusting cap 11 can be adjusted upwardly or downwardly within the distance of adjusting threads 13, which are machined within the inside surface of the upper region of internal cup 5.

Adjusting cap 11 can have calibrations on the top surface thereof indicating various positions for the cap ranging from 0 to 9. The position of the adjusting cap 11 is indicated by means of dial pin 14. A pin stop 15 is mounted at the end of dial pin 14 and, when in place, prevents anyone intending to adjust the setting of the adjusting cap 11 from deliberately or inadvertently completely screwing cap 11 out of threads 13, and thereby breaking the magnetic circuit and reducing the effectiveness of the device.

A number of O-rings 16 (eight shown in FIG. 1) are positioned at various critical positions throughout the internal regions of the water conditioner 1 in order to prevent water under high pressure leaking between the interfaces of the various components making up the water conditioner 1.

A magnetic field created by magnet 7, and transmitted through magnet extension 9 passes between seat interface 17 and valve seat 18. The distance between seat interface 17 of magnet extension 9 and valve seat 18 at the bottom of cup 5 can be adjusted to provide different settings. Accordingly, the length and hence strength of the magnetic field can be adjusted within certain limits. Furthermore, since the distance between seat interface 17 and valve seat 18 can be adjusted, the rate of water flow passing through housing 2 can also be adjusted.

The construction shown has the advantage that by means of cooperating carefully machined bevelled faces, seat interface 17 can be closed completely down upon valve seat 18, thereby completely stopping the flow of water through the housing 2. Furthermore, as the rate of water flow through housing 2 is reduced by closing the gap between seat interface 17 and valve seat 18, the reduction in the gap has the effect of increasing the magnetic flux or gauss-force of the magnetic field existing between seat interface 17 and valve seat 18. This is highly advantageous because studies appear to show that for best results, higher magnetic forces should be used for reduced rates of water flow. The gap design between interface 17 and seat 18 is advantageous also because it tends to provide a Venturi-effect on the water at this location and thereby tends to keep the gap area free of foreign particles.

Figure 2:
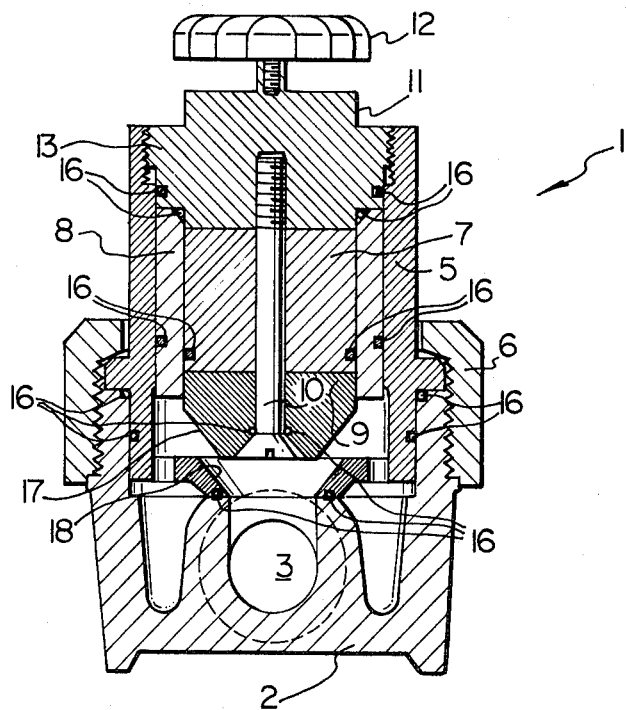
FIG. 2 represents an end elevation partly-sectioned view of the adjustable magnetic water conditioner.
Figure 3:
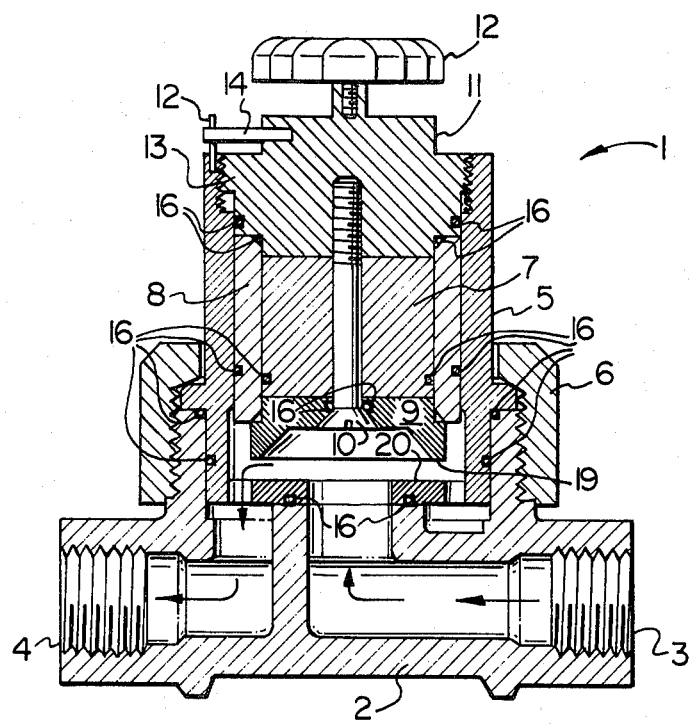
FIG. 3 represents a side elevation partly-sectioned view of an alternative embodiment of the magnetic water conditioner.
Figure 4:
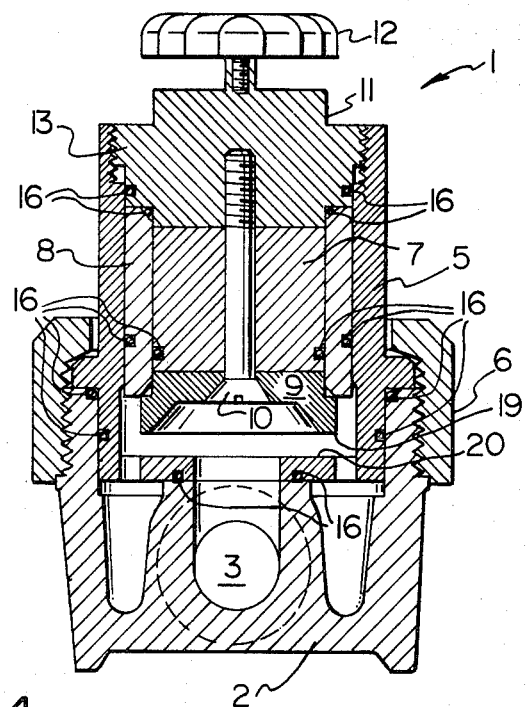
FIG. 4 represents an end elevation partly-sectioned view of an alternative embodiment of the magnetic water conditioner.

FIGS. 3 and 4 depict an alternative embodiment of magnetic water conditioner 1. Essentially, the components of the alternative embodiment are basically the same as those discussed above in connection with the embodiment shown in FIGS. 1 and 2. However, the design of magnetic extension 9 is different from that shown in FIGS. 1 and 2. Seat interface 19 in the alternative embodiment shown in FIGS. 3 and 4 is machined to have a horizontal planar face. Furthermore, valve seat 20 at the bottom region of cup 5 is not cupped as shown in the embodiment depicted in FIGS. 1 and 2, but is machined to have a horizontal planar face corresponding to the face of interface 19. The magnetic field, by means of this construction, passes vertically between seat interface 19 and valve seat 20. Thus, the water passing through the conditioner 1 passes through the magnetic field immediately before passing downwardly through the exit-port openings that are located at the bottom region of internal cup 5. As with the embodiments shown in FIGS. 1 and 2, the distance between seat interface 19 and valve seat 20 can be adjusted within prescribed limits, and indeed, closed completely to adjust the rate of water flow through the housing and also the intensity of the magnetic field.

Interface 17 and valve seat 18, shown in the embodiment depicted in FIGS. 1 and 2, is preferred for completely stopping the flow of water through the conditioner 1. The angled orientation of the seat interface 17 with valve seat 18 provides greater surface area and superior closing action. However, this arrangement has the effect of spreading the magnetic field over a greater area but acts to keep the magnetic gap free of foreign particles. The embodiment shown in FIGS. 3 and 4 has the advantage that the magnetic field can be highly localized between seat face 19 and valve seat 20.

Typically, in constructing the water conditioner 1 for commercial purposes, housing 2 can be constructed of brass or a plastic having a high pressure capability as dictated by plumbing codes in effect in the area where the conditioner 1 is installed. The magnetic circuit components, internal cup 5, magnet extension 7 and adjusting cap 11 are preferably constructed to stainless steel, since these components are subject to water exposure and should be corrosion resistant. Collar 6 can be constructed of brass, steel or a strong thermostatic plastic having good dimensional stability and high pressure capabilities. The magnet housing 8 can be constructed of either brass or strong pressure and corrosion resistant plastic or steel. All O-rings 16 are constructed of a suitable elastic degradation-resistant-material such as synthetic rubber, possibly Neoprene. Screw 10, dial pin 14 and pin stop 15 can be constructed of brass. Handle 12 can be constructed of some suitable metal such as cast-aluminum, brass or steel.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The embodiments of the invention in which an exclusive property or privilege is claimed are defined as follows:

1. A magnetic water conditioning device comprising:
   (a) a hollow housing suitable for the passage therethrough of water;
   (b) a hollow cup affixed to housing (a);
   (c) a permanent magnet enclosed around its circumference within a water-protective sleeve, and at its ends respectively by an adjusting cap and a magnet extension, said components fitting as an assembled group within the interior of internal cup (b); and
   (d) internal cup (b) having therein one or more ports through which water may pass, and embodying therein externally adjustable interface surfaces which can be adjusted in distance from one another to thereby regulate the rate of flow of water through the interface area.

2. A magnetic water conditioner according to claim 1 wherein a water filter is included on the device.

3. A magnetic water conditioning device according to claim 1 wherein the magnetic field created by the permanent magnet passes across the adjustable interface surfaces, thereby magnetically treating any water flowing between the surfaces.

4. A magnetic water conditioning device according to claim 3 including stop means for restricting the movement of said adjustable interface surfaces within a confined distance to thereby prevent the magnetic circuit created by said magnet from being broken and consequently weakening said magnet.

5. A magnetic water conditioning device according to claim 1 wherein the interface surfaces are beveled.

6. A magnetic water conditioning device according to claim 1 wherein the intensity of said magnetic field passing across said interface surfaces is in the range of 6,000 to 12,000 gauss.

7. A magnetic water conditioning device according to claim 1 wherein said magnet extension is made of a corrosion resistant substance.

8. A magnetic water conditioner according to claim 1, wherein said externally adjustable interface surfaces forming a passage that narrows quickly and then opens gradually creating a venturi effect, thereby reducing plating in the flow path.

9. A magnetic water conditioner as described in claim 4, wherein said hollow cup and said adjusting cap are threaded such that when the adjusting cap is rotated the adjustable interface surfaces are adjusted.

10. A magnetic water conditionig device according to claim 9, wherein said stop means include:
    a handle attached to said adjusting cap, and
    a stop to limit the amount of rotation of said handle.

* * * * *